US011146353B2

(12) United States Patent
Li et al.

(10) Patent No.: US 11,146,353 B2
(45) Date of Patent: Oct. 12, 2021

(54) WIRELESS LOCAL AREA NETWORK DATA TRANSMISSION METHOD AND APPARATUS FOR FLEXIBLY CONFIGURING A BANDWIDTH MODE

(71) Applicant: Huawei Technologies Co., Ltd., Shenzhen (CN)

(72) Inventors: Yunbo Li, Shenzhen (CN); Sheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/428,401

(22) Filed: May 31, 2019

(65) Prior Publication Data
US 2019/0372706 A1 Dec. 5, 2019

(30) Foreign Application Priority Data
May 31, 2018 (CN) .......................... 201810549735.8

(51) Int. Cl.
*H04W 74/08* (2009.01)
*H04W 84/12* (2009.01)
(Continued)

(52) U.S. Cl.
CPC .......... *H04L 1/0013* (2013.01); *H04L 1/0003* (2013.01); *H04W 74/0808* (2013.01); *H04W 88/08* (2013.01); *H04W 84/12* (2013.01)

(58) Field of Classification Search
CPC ............... H04L 1/0013; H04L 1/0003; H04W 74/0808; H04W 88/08; H04W 84/12; H04W 76/15
See application file for complete search history.

(56) References Cited

U.S. PATENT DOCUMENTS

2003/0063587 A1 * 4/2003 Cho ...................... H04L 1/0034
370/335
2007/0002878 A1 * 1/2007 Moorti .................. H04L 1/0041
370/401
(Continued)

FOREIGN PATENT DOCUMENTS

JP       2018502482 A    1/2018
WO      2016161843 A1   10/2016
(Continued)

OTHER PUBLICATIONS

Deng et al., "IEEE 802.11ax: Highly Efficient WLANS for Intelligent Information Infrastructure," IEEE Communications Magazine, Dec. 2017, pp. 52-59 (Year: 2017).*
(Continued)

*Primary Examiner* — Un C Cho
*Assistant Examiner* — Lalita W Pace
(74) *Attorney, Agent, or Firm* — Conley Rose, P.C.

(57) ABSTRACT

A wireless local area network data transmission method and an apparatus, such that a bandwidth mode can be flexibly configured, and idle channel utilization and a throughput can be increased. The method includes sending, by a first station (STA), respective preambles and data on a primary channel and at least one secondary channel of a communication channel to a second STA, where the at least one secondary channel includes some secondary channels of the communication channel, and a bandwidth (BW) sub-field in the preamble is set to a value that indicates a complete bandwidth of the communication channel and that indicates skipping preamble puncturing.

20 Claims, 9 Drawing Sheets

(51) Int. Cl.
*H04L 1/00* (2006.01)
*H04W 88/08* (2009.01)

(56) References Cited

U.S. PATENT DOCUMENTS

| | | | | |
|---|---|---|---|---|
| 2012/0014335 A1* | 1/2012 | Adachi | ............ | H04W 72/0446 |
| | | | | 370/329 |
| 2012/0314673 A1 | 12/2012 | Noh et al. | | |
| 2015/0063340 A1 | 3/2015 | Cai et al. | | |
| 2016/0142187 A1 | 5/2016 | Yang et al. | | |
| 2017/0366329 A1* | 12/2017 | Cao | ........................ | H04L 5/0094 |
| 2018/0279371 A1* | 9/2018 | Li | ..................... | H04W 74/0816 |
| 2018/0302858 A1 | 10/2018 | Son et al. | | |
| 2019/0215037 A1* | 7/2019 | Seok | .................... | H04B 7/0417 |
| 2019/0238301 A1* | 8/2019 | Verma | ................... | H04L 5/0094 |
| 2019/0327740 A1* | 10/2019 | Verma | ................... | H04L 5/0044 |
| 2021/0029774 A1* | 1/2021 | Lim | ...................... | H04W 76/28 |

FOREIGN PATENT DOCUMENTS

| | | |
|---|---|---|
| WO | 2017003229 A1 | 1/2017 |
| WO | 2017111567 A2 | 6/2017 |
| WO | WO-2018152224 A1 * | 8/2018 ............... H04L 1/00 |

OTHER PUBLICATIONS

Zhang et al., "Spec Texton Bandwidth Field in HE-SIG-A of HE-MU Format," IEEE 802.11-16/0899r0, IEEE )802.11 Wireless LANs, Jul. 2016, pp. 1-4 (Year: 2016).*

"Part 11: Wireless LAN Medium Access Control (MAC) and Physical Layer (PHY) Specifications," IEEE Std 802.11™, IEEE Computer Society, Dec. 7, 2016, 3534 pages.

Foreign Communication From a Counterpart Application, European Application No. 19177658.2, Extended European Search Report dated Sep. 25, 2019, 8 pages.

IEEE 802. 11-17/0060r3, Li, Y., et al., "Comment Resolution on CCA for Preamble Puncturing," IEEE P802.11 Wireless LANs, Jan. 17, 2017, 9 pages.

IEEE 802. 11-18/0496r3, Fischer, M., et al., "Disallowed Sub channels," IEEE P802.11 Wireless LANs, Apr. 16, 2018, 11 pages.

* cited by examiner (a)　　　　　　　(b)　　　　　　　(c)

(a)　　　　　　　(b)　　　　　　　(c)

(d)　　　　　　　(e)

(a)

(b)

WIRELESS LOCAL AREA NETWORK DATA TRANSMISSION METHOD AND APPARATUS FOR FLEXIBLY CONFIGURING A BANDWIDTH MODE

CROSS-REFERENCE TO RELATED APPLICATION

This application claims priority to Chinese Patent Application No. 201810549735.8, filed on May 31, 2018, which is hereby incorporated by reference in its entirety.

TECHNICAL FIELD

This application relates to the field of communications technologies, and in particular, to a wireless local area network (WLAN) data transmission method and an apparatus.

BACKGROUND

In accordance with different national regulations, a 5 gigahertz (GHz) frequency band in a WLAN may include a dozen or more than twenty 20 megahertz (MHz) bandwidth channels. The WLAN allows two, four, or eight 20 MHz bandwidth channels to be combined into a 40 MHz bandwidth channel, an 80 MHz bandwidth channel, or a 160 MHz bandwidth channel. The 40 MHz bandwidth channel and the 80 MHz bandwidth channel are formed by combining contiguous 20 MHz bandwidth channels. The 160 MHz bandwidth channel may be formed by combining eight contiguous 20 MHz bandwidth channels, and this combination is referred to as a 160 MHz channel. The 160 MHz bandwidth channel may alternatively be formed by combining two nonadjacent 80 MHz bandwidth channels, and this 160 MHz bandwidth channel is referred to as an 80+80 MHz channel.

When using an 80 MHz channel, a 160 MHz channel, or an 80+80 MHz channel as a communication channel to transmit data, a station (STA) in the WLAN first performs clear channel assessment (CCA) on the communication channel. The station transmits the data using the communication channel only when a CCA result is that all 20 MHz bandwidth channels of the communication channel are idle, otherwise, the station transmits the data after decreasing a bandwidth of the communication channel. However, the communication channel can be decreased to only a specified bandwidth. For example, an 80 MHz channel can be decreased to only a 40 MHz channel or a 20 MHz channel. Even if the CCA result is that only one 20 MHz bandwidth channel of the 80 MHz channel is busy, the station can transmit the data by decreasing the 80 MHz channel to only a 40 MHz channel, but cannot transmit the data by combining all three idle 20 MHz bandwidth channels into a 60 MHz bandwidth channel.

SUMMARY

This application provides a WLAN data transmission method and an apparatus, such that a bandwidth mode can be flexibly configured, while idle channel utilization and throughput can be increased.

According to a first aspect, this application provides a wireless local area network data transmission method. The method includes sending, by a first station (STA), respective preambles and data on a primary channel and at least one secondary channel of a communication channel to a second STA. When the at least one secondary channel includes some secondary channels of the communication channel, a bandwidth (BW) sub-field in the preamble is set to a value that indicates a complete bandwidth of the communication channel and that indicates skipping preamble puncturing.

According to the WLAN data transmission method provided in this application, when some secondary channels of the communication channel are unavailable, the first STA still sets a bandwidth mode to the value that indicates the complete bandwidth of the communication channel and that indicates skipping preamble puncturing, and the first STA sends data and a preamble on only the primary channel and the idle secondary channel. When receiving the preamble and the data, the second STA can determine, based on a used decoding manner, channels on which the first STA sends the preamble and the data. Therefore, the first STA can send the preamble and the data on the primary channel and the idle secondary channel without decreasing the bandwidth mode. In this way, utilization of the communication channel and throughput are increased, while the second STA does not need to support a preamble puncturing mechanism.

Optionally, if no acknowledgement frame sent by the second STA is received within a preset time period, the first STA decreases a value of a modulation and coding scheme (MCS) used for sending each preamble and the data, and resends the preamble and the data based on the modified value of the MCS.

Optionally, if no acknowledgement frame sent by the second STA is received within the preset time period, and the value of the MCS is a preset minimum value, the first STA decreases a bandwidth mode indicated by the BW sub-field, and sends the preamble and the data using the decreased bandwidth mode.

Optionally, before sending, by a first station STA, respective preambles and data to a second STA on a primary channel and at least one secondary channel of a communication channel, the method further includes performing, by the first STA, clear channel assessment (CCA) on the communication channel, where a result of the CCA is that the primary channel and the at least one secondary channel are idle.

According to a second aspect, this application provides a STA, where the STA has functions for implementing the first STA in the first aspect. The STA includes one or more units corresponding to the functions described in the first aspect.

According to a third aspect, this application provides a transmitter chip, applied to a STA, including a control circuit, a signal processing circuit, and a transmitter circuit. The control circuit is configured such that when a channel mode of a communication channel is a primary channel and at least one secondary channel, and the at least one secondary channel includes some channels of the communication channel, the control circuit sets a BW sub-field in a to-be-sent preamble to a value that indicates a complete bandwidth of the communication channel and that indicates skipping preamble puncturing. The signal processing circuit is configured to perform signal processing on the preamble in which the BW sub-field is set and to-be-sent data based on a bandwidth mode indicated by the BW sub-field. The transmitter circuit is configured to send each processed preamble and processed data to a second STA on the primary channel and the at least one secondary channel.

Optionally, the transmitter circuit includes a transmitter sub-circuit corresponding to each channel of the communication channel. That the transmitter circuit sends each processed preamble and processed data to a second STA on the primary channel and the at least one secondary channel is such that a transmitter sub-circuit corresponding to the primary channel sends, to the second STA on the primary channel, the processed preamble and the processed data that are corresponding to the primary channel. Additionally, each of at least one transmitter sub-circuit that is in a one-to-one correspondence with the at least one secondary channel sends, to the second STA on a corresponding secondary channel, the preamble and the data that are corresponding to the corresponding secondary channel.

Optionally, the signal processing circuit is further configured such that if the STA receives, within a preset time period, no acknowledgement frame sent by the second STA, the signal processing circuit decreases a value of an MCS used for sending each preamble and the data. Additionally, the transmitter circuit is further configured to resend, based on the value of the MCS modified by the signal processing circuit, the preamble and the data that are processed by the signal processing circuit.

Optionally, the control circuit is further configured such that if the STA receives, within the preset time period, no acknowledgement frame sent by the second STA, and the value of the MCS is a preset minimum value, the control circuit decreases the bandwidth mode indicated by the BW sub-field. The signal processing circuit is further configured to perform, based on a decreased bandwidth mode, signal processing again on the preamble and the data that are modified by the control circuit. Additionally, the transmitter circuit is further configured to send each re-processed preamble and re-processed data using the decreased bandwidth mode.

Optionally, the control circuit is further configured such that before the BW sub-field in the to-be-sent preamble is set to the value that indicates the complete bandwidth of the communication channel and that indicates skipping preamble puncturing, the control circuit obtains a CCA result of clear channel assessment performed on the communication channel, where the CCA result is that the primary channel and the at least one secondary channel are idle.

Optionally, the signal processing circuit includes a binary convolutional code (BCC) encoder, a BCC interleaver, a constellation point mapper, a signal repetition module, an inverse discrete Fourier transform (IDFT), and the like. The transmitter sub-circuit corresponding to the primary channel includes a radio frequency simulator, a guard interval (GI) and window controller, and the like that are corresponding to the primary channel. A transmitter sub-circuit corresponding to each secondary channel includes a cyclic shift diversity (CSD), a radio frequency simulator, a GI and window controller, and the like that are corresponding to the secondary channel.

Optionally, in the first aspect to the third aspect, a value of the BW sub-field is 2 or 3.

According to a fourth aspect, this application provides a WLAN device, including the transmitter chip according to any of the third aspect or optional manners of the third aspect. For example, the WLAN device is a wireless access point, a mobile phone, a tablet computer, or a wearable device.

DESCRIPTION OF EMBODIMENTS

The term "and/or" in this specification represents that three relationships may exist. For example, A and/or B may represent the following three cases: only A exists, both A and B exist, and only B exists.

A WLAN data transmission method provided in this application is applicable to a frequency band of 5 GHz and above 5 GHz, such as a subsequent 6 GHz frequency band.

Figure 1:
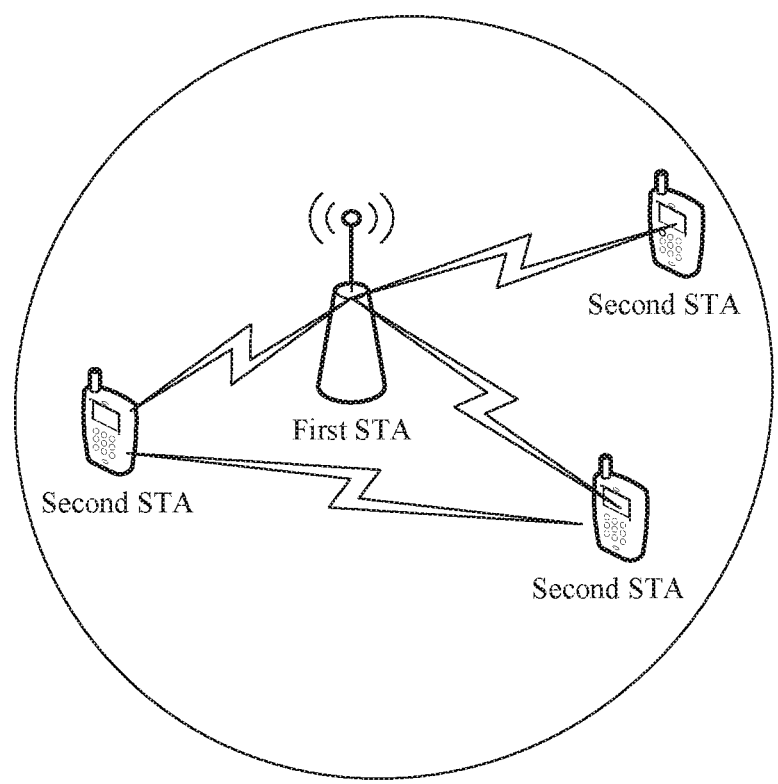
FIG. 1 is a schematic diagram of a network architecture according to an embodiment of this application.

For example, FIG. 1 shows a possible network architecture applicable to a WLAN transmission method provided in this application. The network architecture includes a first station (STA) and at least one second STA. The first STA provides uplink and downlink wireless access for the at least one second STA, and supports an 80 MHz bandwidth mode, a 160 MHz bandwidth mode, an 80+80 MHz bandwidth mode, and other over-80 MHz bandwidth modes. For example, other over-80 MHz bandwidth modes may include a 240 MHz bandwidth mode, a 160+80 MHz bandwidth mode, an 80+160 MHz bandwidth mode, an 80+80+80 MHz bandwidth mode, a 320 MHz bandwidth mode, a 160+160 MHz bandwidth mode, a 160+80+80 MHz bandwidth mode, an 80+80+160 MHz bandwidth mode, or an 80+80+80+80 MHz bandwidth mode. The first STA may be an access point (AP) or a non-AP STA, and the second STA may be a non-AP STA. For example, when the first STA is an AP, the network architecture may be a basic service set (BSS).

When the first STA is sending data and a preamble, the preamble includes a bandwidth (BW) sub-field. The BW sub-field may be generally set to 0 to 3, which are used to indicate four different bandwidth modes of a communication channel. A mode 0 is 20 MHz; a mode 1 is 40 MHz; a mode 2 is an 80 MHz non-preamble puncturing mode; and a mode 3 is a 160 MHz and 80+80 MHz non-preamble puncturing mode.

Figure 2:
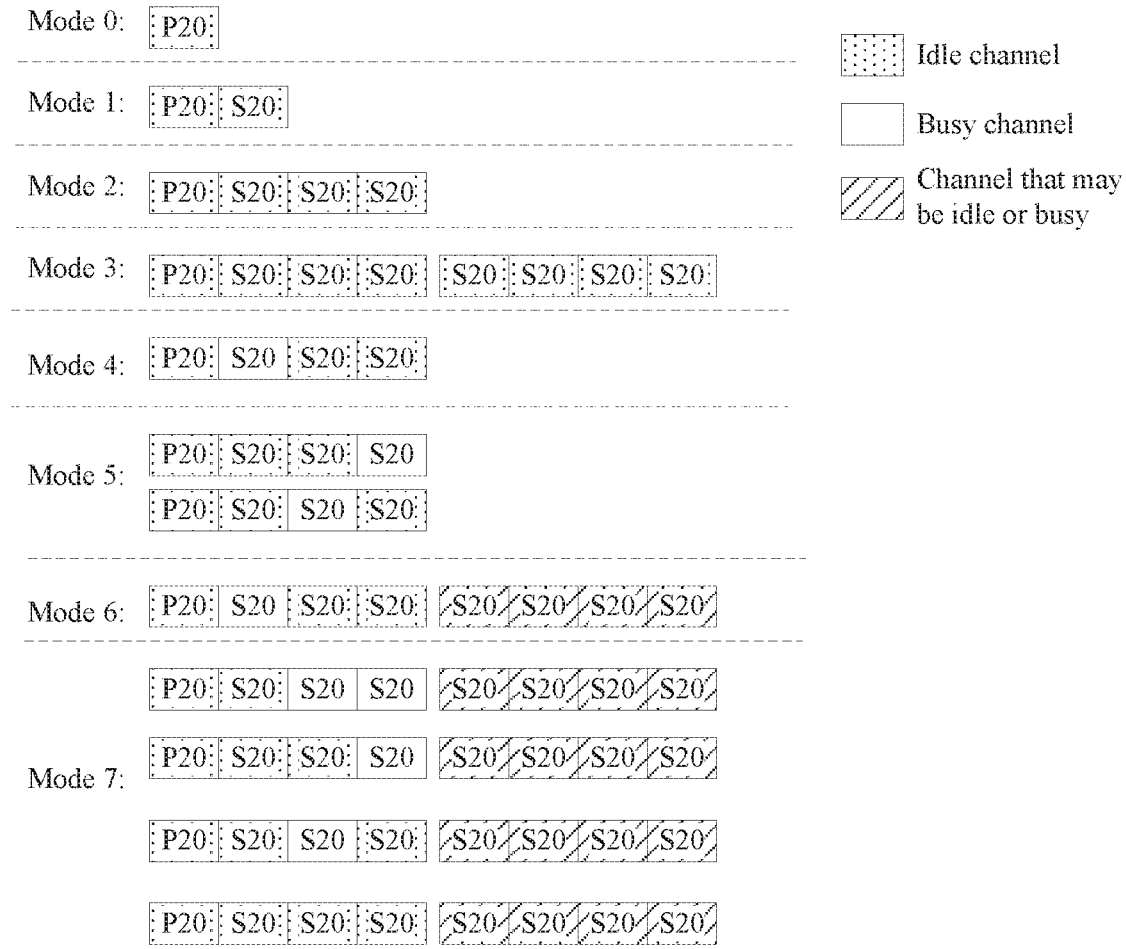
FIG. 2 is a schematic diagram of eight bandwidth modes according to an embodiment of this application.

A possible form of the bandwidth modes 0 to 3 of the communication channel is shown in FIG. 2, where P20 represents a primary channel, and S20 represents a secondary channel. A communication channel with a complete bandwidth of 80 MHz is used as an example. If four 20 MHz channels of the communication channel are all idle, the first STA may send data and a preamble in the mode 2. If there is one secondary channel of the communication channel that is busy, due to a limitation of the modes 0 to 3, the first STA needs to decrease a bandwidth mode, and sends data and a preamble in the mode 0 or the mode 1. In other words, even if there are 60 MHz idle channels of the communication channel, the first STA can send data and a preamble only on a 20 MHz channel or a 40 MHz channel. This bandwidth decreasing manner causes relatively low channel utilization to some extent, and a relatively high throughput cannot be obtained.

To increase utilization of a communication channel with a bandwidth of 80 MHz, 160 MHz, or 80+80 MHz, and obtain a relatively high throughput, the first STA may further send data and a preamble using a preamble puncturing mechanism. The preamble puncturing mechanism is as follows. In a communication channel with a complete bandwidth of 80 MHz, 160 MHz, and 80+80 MHz, assume a primary channel and some secondary channels are idle, and some other secondary channels are busy. At this time, data may be transmitted only on the primary channel and the idle secondary channels, and a preamble and data are not sent on the busy secondary channels. Based on the preamble puncturing mechanism, the BW sub-field may be extended to 0 to 7. A mode 4 is such that a preamble is punctured in 80 MHz, where the preamble is punctured only in secondary 20 MHz. A mode 5 is such that a preamble is punctured in 80 MHz, where the preamble is punctured only in one of two 20 MHz sub-channels of secondary 40 MHz. A mode 6 is such that a preamble is punctured in 160 MHz or 80+80 MHz, where the preamble is punctured only in secondary 20 MHz of primary 80 MHz. A mode 7 is such that a preamble is punctured in 160 MHz or 80+80 MHz, where the preamble appears in primary 40 MHz of primary 80 MHz. A possible manner of the bandwidth modes 0 to 3 of the communication channel may be shown in FIG. 2.

Although the modes 4 to 7 can be used to increase utilization of the communication channel with a bandwidth of 80 MHz, 160 MHz, or 80+80 MHz, and obtain a relatively high throughput, the modes 4 to 7 can be used only when both the first STA and the second STA support the preamble puncturing mechanism. It is very likely that two STAs that perform data transmission are produced by different manufacturers, and both may not support the preamble puncturing mechanism. Therefore, modes 4 to 7 cannot be effectively used. For example, when the second STA does not support the preamble puncturing mechanism, the first STA still sends data using any bandwidth mode (for example, the mode 4) in the modes 4 to 7, and instructs the second STA to receive the data based on the mode 4 indicated by a BW sub-field. However, because the second STA does not support the preamble puncturing mechanism, the second STA cannot recognize the mode 4, and consequently fails to demodulate the data.

According to the WLAN data transmission method provided in this application, when some secondary channels of a communication channel are unavailable, the first STA still sets a bandwidth mode to a value that indicates a complete bandwidth of the communication channel and that indicates skipping preamble puncturing, and the first STA sends data and a preamble only on the primary channel and an idle secondary channel without decreasing the bandwidth mode. In this way, utilization of the communication channel and throughput are increased, while the second STA does not need to support a preamble puncturing mechanism.

Figure 3:
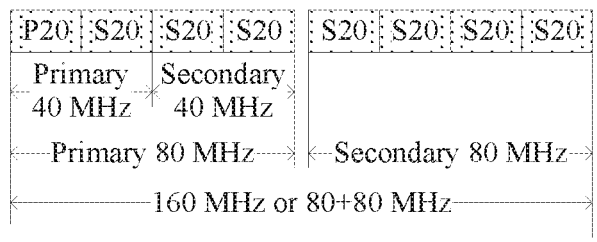
FIG. 3 is a schematic diagram of channel division according to an embodiment of this application.

It is assumed that a communication channel is divided in a basic channel unit of 20 MHz bandwidth channel. As shown in FIG. 3, each first STA is corresponding to one primary channel (such as P20 in FIG. 3), and all 20 MHz bandwidth channels of the communication channel except the primary channel are secondary channels (or referred to as a non-primary channel, such as S20 in FIG. 3). A 40 MHz channel includes two contiguous 20 MHz bandwidth channels, an 80 MHz channel includes two contiguous 40 MHz channels, a 160 MHz channel includes two contiguous 80 MHz channels, and an 80+80 MHz channel includes two non-contiguous 80 MHz channels. In the 80 MHz channel, a 40 MHz channel that includes the primary channel is a primary 40 MHz channel, and the other one is a secondary 40 MHz channel. In the 160 MHz channel and the 80+80 MHz channel, an 80 MHz channel that includes the primary channel is a primary 80 MHz channel, and the other one is a secondary 80 MHz channel.

Figure 4:
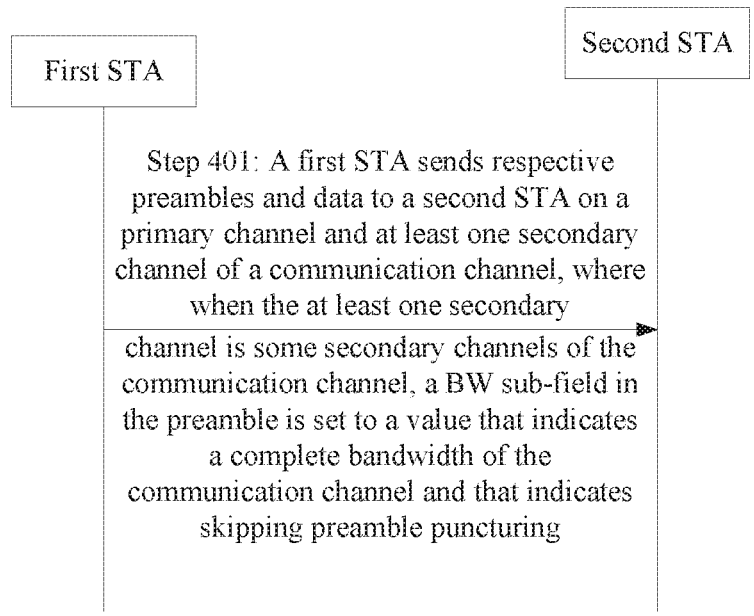
FIG. 4 is a flowchart of a WLAN data transmission method according to an embodiment of this application.

FIG. 4 is a flowchart of an embodiment of a WLAN data transmission method according to this application. The method includes the following.

Step 401: A first STA sends respective preambles and data on a primary channel and at least one secondary channel of a communication channel to a second STA.

The at least one secondary channel is an idle secondary channel of the communication channel. For example, the at least one secondary channel may be some idle secondary channels of the communication channel. Alternatively, the at least one secondary channel may comprise all idle secondary channels of the communication channel. In this application, when the at least one secondary channel includes some secondary channels rather than all secondary channels of the communication channel, a BW sub-field in the preamble is set to a value that indicates a complete bandwidth of the communication channel and that indicates skipping preamble puncturing.

The complete bandwidth of the communication channel may be 80 MHz, 160 MHz, or 80+80 MHz, or may be another type of ultra-wide bandwidth, such as a bandwidth of 240 MHz, 160+80 MHz, 80+160 MHz, 80+80+80 MHz, 320 MHz, 160+160 MHz, 160+80+80 MHz, 80+80+160 MHz, or 80+80+80+80 MHz. When the complete bandwidth of the communication channel is 80 MHz, a value of the BW sub-field may be set to 2. When the complete bandwidth of the communication channel is 160 MHz or 80+80 MHz, a value of the BW sub-field may be set to 3. In other words, regardless of whether the at least one secondary channel is all the secondary channels of the communication channel, the first STA always sets the BW sub-field in the preamble to the value that indicates the complete bandwidth of the communication channel and that indicates skipping preamble puncturing.

In other words, according to the method provided in this application, if there is an unavailable secondary channel of the communication channel with a complete bandwidth of 80 MHz, 160 MHz, or 80+80 MHz, the first STA can still set the bandwidth mode to the mode 2 or the mode 3 that can be recognized by all STAs, and the first STA may send data and a preamble only on the primary channel and an idle secondary channel without decreasing the bandwidth mode. In this way, throughput is increased, and the second STA does not need to support a preamble puncturing mechanism.

Optionally, before sending the data and the preamble, the first STA may first perform CCA on the communication channel, including measuring each channel of the communication channel and determining a busy or idle state of each channel. If a CCA result is that the primary channel and the at least one secondary channel are idle, the first STA may determine to send the respective preambles and the data on the primary channel and the at least one secondary channel to the second STA, and set the BW sub-field in the preamble to the value that indicates the complete bandwidth of the communication channel and that indicates skipping preamble puncturing.

Optionally, if some secondary channels, such as a radar channel, of the communication channel are used to transmit a specific signal, regardless of whether the secondary channels are idle, the first STA always determines that the secondary channels are unavailable. When the primary channel and at least one remaining secondary channel are idle, it is determined that the respective preambles and the data can be sent on the primary channel and the at least one secondary channel to the second STA, and the BW sub-field in the preamble can be set to the value that indicates the complete bandwidth of the communication channel and that indicates skipping preamble puncturing.

Figure 5:
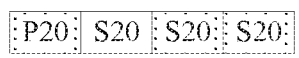
FIG. 5 is a schematic diagram of a channel mode of an 80 MHz communication channel according to an embodiment of this application.
Figure 5:
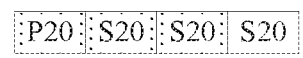
Figure 5:
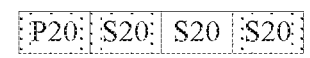

For example, when the complete bandwidth of the communication channel is 80 MHz, as shown in FIG. 5, a channel mode of the communication channel may be one of the following.

A: As shown in FIG. 5(a), both a primary channel of a primary 40 MHz channel and two secondary channels of a secondary 40 MHz channel are all idle, and a secondary channel of the primary 40 MHz channel is busy.

B: As shown in FIGS. 5(b) and (c), two channels of a primary 40 MHz channel and one secondary channel of a secondary 40 MHz channel are idle, and the other secondary channel of the secondary 40 MHz channel is busy.

The two channel modes A and B are respectively the same as bandwidth modes represented in the mode 4 and the mode 5 in the standard. For example, in this application, when the first STA determines that the channel mode of the communication channel is A or B, a value of a BW sub-field in each sent preamble may be set to 2 rather than 4 or 5, in order to ensure that when the second STA does not support the preamble puncturing mechanism, the second STA can recognize the bandwidth mode indicated by the first STA, thereby avoiding failing to demodulate data because the second STA does not support the preamble puncturing mechanism.

When the complete bandwidth of the communication channel is 160 MHz or 80+80 MHz, a channel mode of the communication channel is: a primary channel and at least one secondary channel of a primary 80 MHz channel are idle, and at least one secondary channel of a secondary 80 MHz channel is idle.

Figure 6:
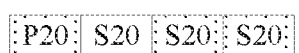
FIG. 6 is a schematic diagram of a channel mode of a primary 80 MHz channel according to an embodiment of this application.
Figure 6:
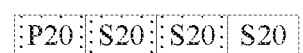
Figure 6:
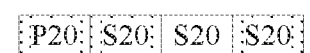
Figure 6:
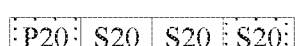
Figure 6:
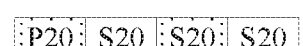

In some embodiments, as shown in FIG. 6, a channel mode of the primary 80 MHz channel may be one of the following.

a: As shown in FIG. 6(a) to FIG. 6(c), one secondary channel is busy, and remaining three channels are idle.

b: As shown in FIGS. 6(d) and (e), the primary channel and one secondary channel of the secondary 40 MHz channel are idle, and remaining two secondary channels are busy.

Figure 7:
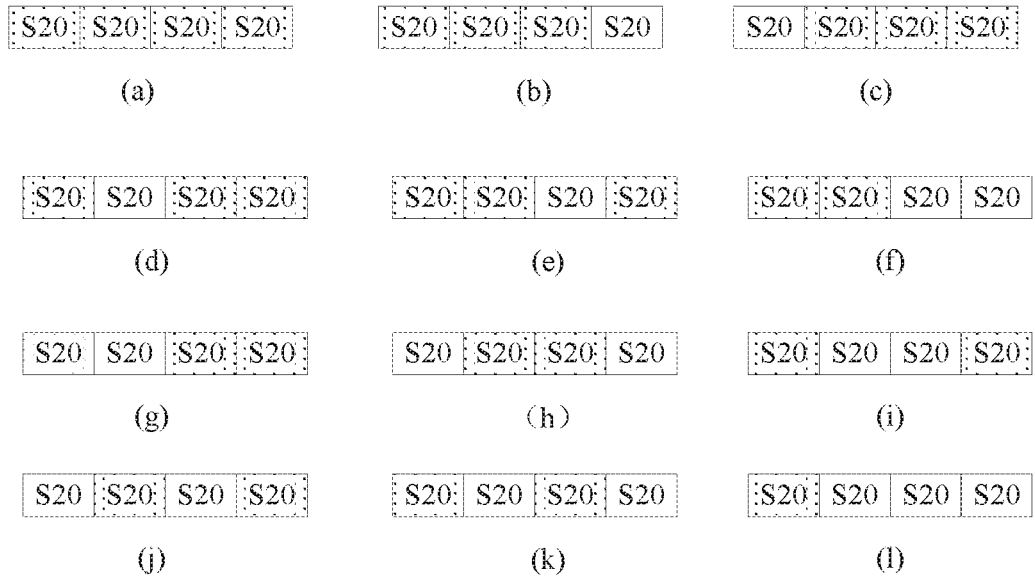
FIG. 7 is a schematic diagram of a channel mode of a secondary 80 MHz channel according to an embodiment of this application.

In some embodiments, as shown in FIG. 7, a channel mode of the secondary 80 MHz channel is one of the following.

c: As shown in FIG. 7(a), four secondary channels are all idle.

d: As shown in FIGS. 7(b) and (c), a first or a fourth secondary channel is busy, and remaining three secondary channels are idle.

e: As shown in FIGS. 7(d) and (e), a second or a third secondary channel is busy, and remaining three secondary channels are idle.

f: As shown in FIGS. 7(f) and (g), a third secondary channel and a fourth secondary channel are busy, or a first secondary channel and a second secondary channel are busy, and remaining two secondary channels are idle.

g: As shown in FIGS. 7(h) and (i), a second secondary channel and a third secondary channel are busy, or a first secondary channel and a fourth secondary channel are busy, and remaining two secondary channels are idle.

h: As shown in FIGS. 7(j) and (k), a first secondary channel and a third secondary channel are busy, or a second secondary channel and a fourth secondary channel are busy, and remaining two secondary channels are idle.

i: As shown in FIG. 7(l), a first secondary channel is idle, and remaining three secondary channels are busy.

When the complete bandwidth of the communication channel is 160 MHz or 80+80 MHz, the channel modes shown in FIGS. 6(b) and (c) are the same as the two situations in the mode 7 in the standard. For example, in this application, when the first STA determines that a channel mode of the primary 80 MHz channel of the communication channel is the channel modes shown in FIGS. 6(b) and (c), a value of a BW sub-field in each sent preamble may be set to 3 rather than 7, in order to ensure that when the second STA does not support the preamble puncturing mechanism, the second STA can recognize the bandwidth mode indicated by the first STA, thereby avoiding failing to demodulate data because the second STA does not support the preamble puncturing mechanism.

When the complete bandwidth of the communication channel is 160 MHz or 80+80 MHz, the illustrated bandwidth modes of the primary 80 MHz channel and the bandwidth modes of the secondary 80 MHz channel may be combined randomly, and this is not limited in this application.

This application further provides an optional manner. When the complete bandwidth of the communication channel is 160 MHz or 80+80 MHz, if four channels of a secondary 80 MHz channel are all busy, and a channel mode of a primary 80 MHz channel is one of the channel modes a or b, the first STA may also set a BW field to a value of 80 MHz and that indicates skipping preamble puncturing, for example, 2.

A WLAN system supports an increasingly large bandwidth, and may support a bandwidth greater than 160 MHz in the future, and provide channel flexibility in the greater bandwidth in a preamble puncturing manner. For example, a 320 MHz or 240 MHz bandwidth may be introduced to the WLAN. When the 320 MHz bandwidth appears in a form of non-contiguous bandwidths, the 320 MHz bandwidth may be 160+160 MHz, 160+80+80 MHz, 80+80+160 MHz, or 80+80+80+80 MHz. When the 240 MHz bandwidth appears in a form of non-contiguous bandwidths, the 240 MHz bandwidth may be 160+80 MHz, 80+160 MHz, or 80+80+80 MHz. In these large bandwidth modes, the solution of this patent can still be used. In some embodiments, a value of a complete bandwidth and that indicates skipping preamble puncturing is indicated in a BW sub-field, and preamble puncturing is performed on some secondary channels during actual transmission.

Figure 8:
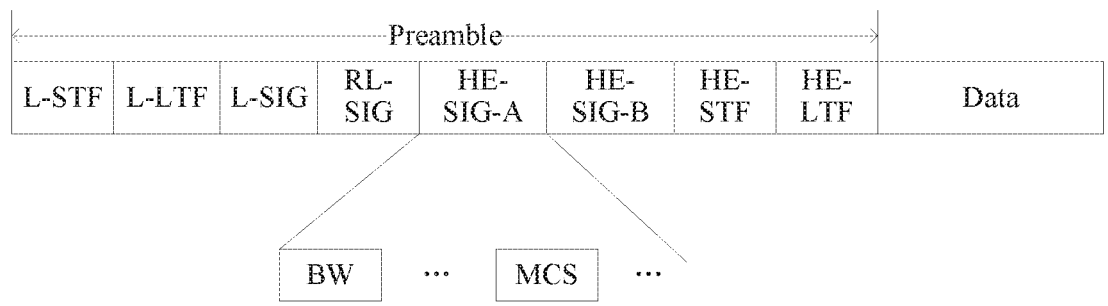
FIG. 8 is a schematic diagram of a high efficiency (HE) multiple-user (MU) physical layer (PHY) protocol data unit (PDU) format according to an embodiment of this application.

In an example, when sending the preamble and the data, the first STA may perform data transmission in a high efficiency (HE) multi-user (MU) physical layer (PHY) PDU (HE MU PPDU) format. For example, FIG. 8 shows an HE MU PPDU format according to this application. An HE MU PPDU includes a preamble part and a data part. The preamble includes: a legacy short training field (L-STF) field, a legacy long training field (L-LTF) field, a legacy signal (L-SIG) field, a repeated legacy signal (RL-SIG) field, a high efficiency signal A (HE-SIG-A) field, a high efficiency signal B (HE-SIG-B) field, a high efficiency short training field (HE-STF) field, a high efficiency long training field (HE-LTF) field, and the like. The HE-SIG A field includes indication fields such as a BW sub-field and a modulation and coding scheme (MCS) sub-field.

According to the WLAN data transmission method provided in this application, when the first STA sends the data and the preamble on the primary channel and the at least one idle secondary channel of the current communication channel, and the communication channel includes at least one busy secondary channel, the BW sub-field may be set to the value that indicates the complete bandwidth of the communication channel and that indicates skipping preamble puncturing.

Figure 9:
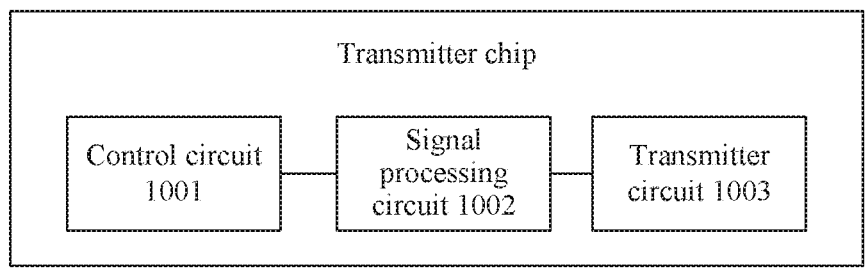
FIG. 9 is a first schematic structural diagram of a transmitter chip according to an embodiment of this application.

For example, FIG. 9 is a schematic structural diagram of a transmitter chip of a first STA according to this application. When the first STA sends an HE-SIG-A field in a preamble, a control circuit 1001 in the transmitter chip of the first STA sets a BW sub-field based on a current channel mode of a communication channel. In some embodiments, when the first STA determines to send the HE-SIG-A field on a primary channel and at least one secondary channel, the control circuit 1001 sets the BW sub-field to a value that indicates a complete bandwidth of the communication channel and that indicates skipping preamble puncturing.

The control circuit 1001 may determine, based on a received CCA result or a received channel mode, that the first STA determines to send the HE-SIG-A field on the primary channel and the at least one secondary channel.

For a communication channel with a complete bandwidth of 80 MHz, provided that a primary channel and some secondary channels of four channels are idle, the control circuit 1001 may set the value of the BW sub-field to 2, instead of setting the value of the BW sub-field to 2 when all the four channels are idle. For a communication channel with a complete bandwidth of 160 MHz or 80+80 MHz, provided that a primary channel and some secondary channels are idle, the value of the BW sub-field may be set to 3, instead of setting the BW sub-field to 3 when all eight channels are idle.

After the BW sub-field is set, the HE-SIG-A field is processed by a signal processing circuit 1002, a processed signal is sent to a transmitter circuit 1003, and the transmitter circuit 1003 performs multiple output on the processed signal. The transmitter circuit 1003 may include a transmitter sub-circuit corresponding to each channel of the communication channel. A transmitter sub-circuit corresponding to the primary channel may include a radio frequency simulator, a guard interval (GI) and window controller, and the like. For the primary channel, the corresponding transmitter sub-circuit directly inserts a GI and a window into the HE-SIG-A field using the GI and window controller, and then sends the HE-SIG-A field to the primary channel using the radio frequency simulator. Each transmitter sub-circuit corresponding to a secondary channel may include a cyclic shift diversity (CSD), a radio frequency simulator, a GI and window controller, and the like. For all of the at least one secondary channel, a corresponding transmitter sub-circuit maps a same HE-SIG-A field to the corresponding secondary channels using a corresponding CSD device, then inserts a GI and a window into the HE-SIG-A field using the GI and window controller, and sends the HE-SIG-A field to the corresponding secondary channel using the corresponding radio frequency simulator.

The signal processing circuit 1002 may include a binary convolutional code (BCC) encoder, a BCC interleaver, a constellation point mapper, a signal repetition module, an inverse discrete Fourier transform (IDFT) module, and the like. The signal repetition module is configured to control the HE-SIG-A field to be sent repeatedly only on the primary channel and the at least one secondary channel, rather than on an unavailable secondary channel of the communication channel.

When sending an HE-SIG-B field in the preamble, the transmitter chip performs physical layer (PHY) supplement and forward error correction (FEC) on the HE-SIG-B field, processes the HE-SIG-B field using a processing module, and then performs multiple output. Content, sent on odd-numbered channels, of the HE-SIG-B field is the same, content, sent on even-numbered channels, of the HE-SIG-B field is the same, and the content sent on the odd-numbered channels is different from that sent on the even-numbered channels. Therefore, in this application, when a BW is greater than 20 MHz, the signal repetition module needs to control a same HE-SIG-B field to be sent repeatedly only on the primary channel and an odd-numbered channel of the at least one secondary channel, and a same HE-SIG-B field to be sent repeatedly only on the primary channel and an even-numbered channel of the at least one secondary channel.

In an HE MU PPDU frame structure, content, sent on the odd-numbered channels, of the HE-SIG-B field is the same, and content, sent on the even-numbered channels, of the HE-SIG-B field is the same. Therefore, the second STA may perform decoding in a combination (e.g., the odd-numbered channels are combined and the even-numbered channels are combined) manner. In a process of decoding the HE-SIG-B field in a combination manner, the second STA can determine, to some extent, a channel on which a normal signal (that is, the data and the preamble that are sent by the first STA to the second STA) is sent, and further receive and decode other preamble information and data that are transmitted on the channel on which the normal signal is sent.

In this application, although the bandwidth mode indicated by the first STA is the complete bandwidth of the communication channel, actually, it is very likely that the second STA receives and demodulates the data on the entire communication channel according to an indication of the first STA, instead of sending the data and the preamble on the entire communication channel by the first STA. Therefore, when the second STA receives and demodulates the data in the combination manner, signals combined by the second STA may not be all normal signals, and this affects data demodulation of the second STA to some extent. An impact, caused by the WLAN data method provided in this application, on data demodulation of the second STA is described below using an example of a schematic diagram of a simulation result shown in FIG. 10.

Figure 10:
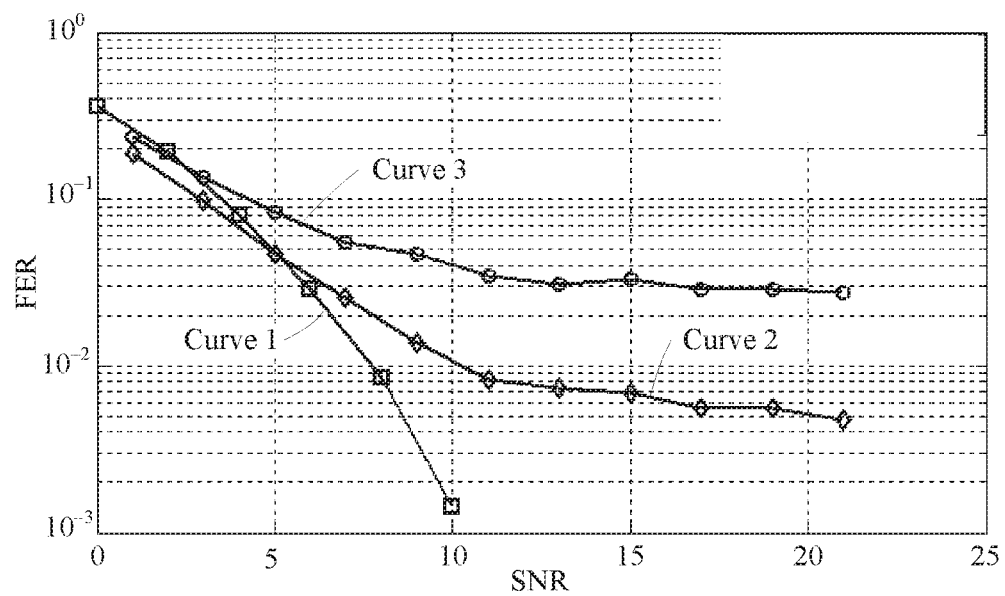
FIG. 10 is a schematic diagram of a simulation result according to an embodiment of this application.
Figure 10:
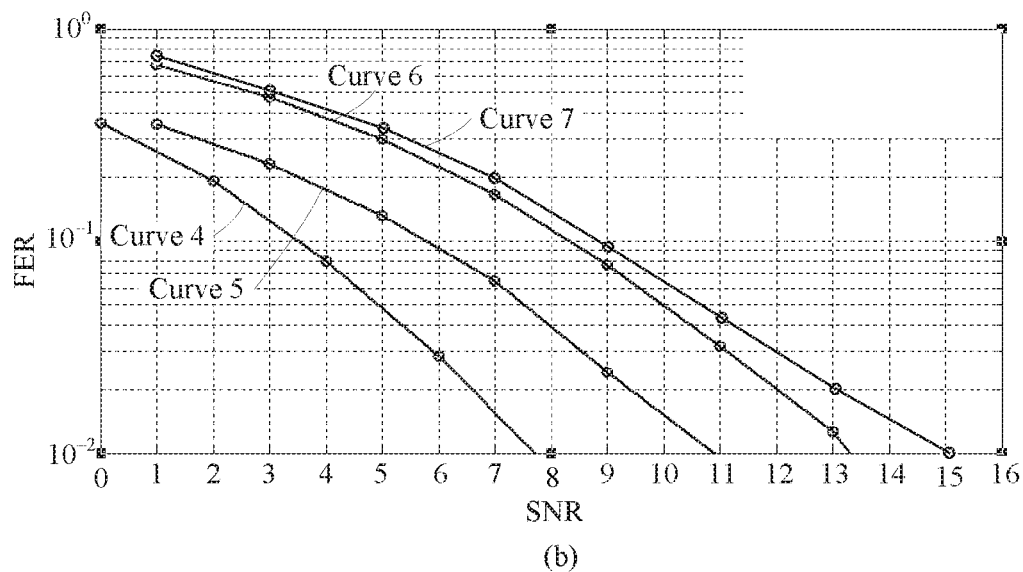

For example, it is assumed that link simulation is performed using the following simulation conditions. An HE-SIG-B length is two orthogonal frequency-division multiplexing (OFDM) symbols; an MCS index is MCS0; and in two signals that are combined, one is a normal signal, and the other is an interfering signal. FIG. 10(*a*) shows a simulation result obtained when the second STA uses an equal-gain diversity combining manner. A curve 1 represents a base line, that is, a curve graph of a trend in which a frame erase ratio (FER) varies with a signal-to-noise ratio (SNR) when the two signals that are combined are normal signals. A curve 2 represents a trend in which an FER varies with an SRN when a normal signal is combined with an interfering signal with a strength of −9 decibel (dB). When an SNR of the second STA is greater than 10 dB, the FER may be decreased to below 0.01. It can be learned by comparing the curve 1 with the curve 2 that, when FER is equal to 0.01, compared with a combination of two normal signals, about 2.5 SNR performance is lost if the normal signal and the interfering signal with the strength of −9 dB are combined, but an FER requirement can still be met. A curve 3 represents a trend in which an FER varies with an SRN when a normal signal and an interfering signal with a strength of −6 dB are combined. Regardless of how great a reception SNR of the second STA is, an FER requirement (that is, making the FER less than or equal to 0.01) cannot be met, and an error floor occurs. Therefore, if the second STA demodulates data in the equal-gain diversity combining manner, the solution provided in this application can be used when a strength of the interfering signal is less than −9 dB.

FIG. 10(*b*) shows a simulation result obtained when the second STA uses a maximum ratio combining (MRC) manner. A curve 4 represents a base line. A curve 5 represents a trend in which an FER varies with an SNR when a strength of an interfering signal is 0 dB. A curve 6 represents a trend in which an FER varies with an SNR when a strength of an interfering signal is 18 dB. A curve 7 represents a trend in which an FER varies with an SNR when a strength of an interfering signal is infinitely great. It can be learned by comparing the curves 4 to 7 that, although different interfering strengths may cause different SNR performance losses, regardless of how great the strength of the interfering signal is, an error floor does not occur when the second STA demodulates data in the MRC manner, and the FER can always be decreased below 0.01. Therefore, when the second STA demodulates data in the MRC manner, regardless of how great the interfering signal is, the solution provided in this application can be used.

Because second STAs produced by different manufacturers may use different decoding manners, different second STAs may have different performance losses. When the first STA sends data to the second STA using the solution provided in this application, if the second STA completely supports the solution, for example, when performing parsing using maximum ratio combining, the second STA correctly replies with an acknowledgement frame to the first STA. For a second STA that fails to reply with an acknowledgement frame, this application further provides another embodiment.

Figure 11:
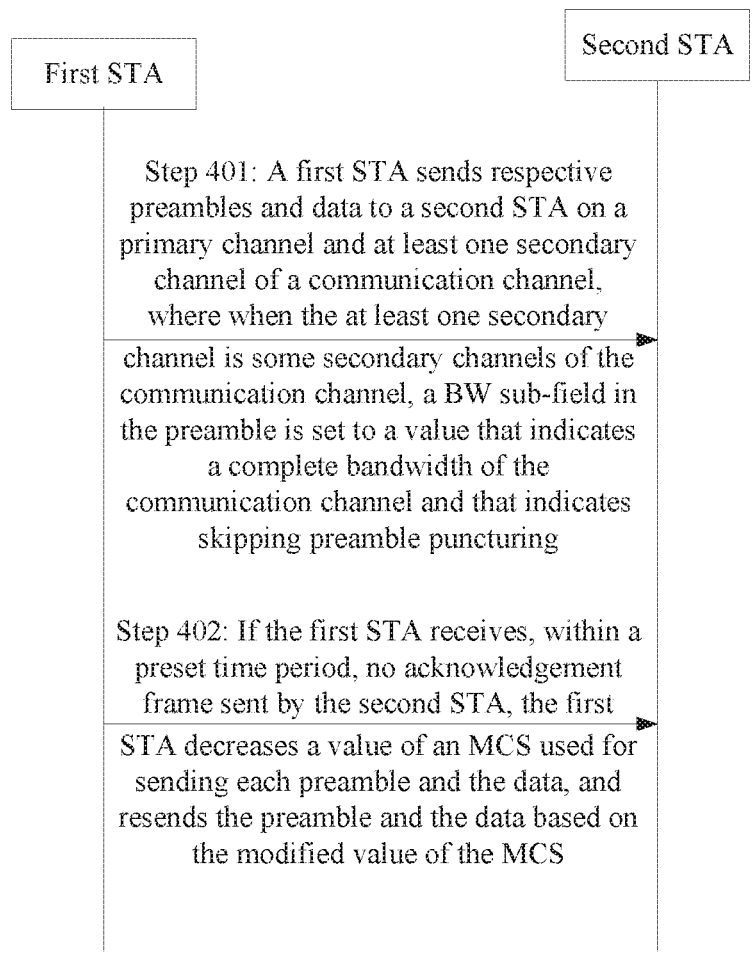
FIG. 11 is a flowchart of a WLAN data transmission method according to another embodiment of this application.

For example, with reference to FIG. 4, FIG. 11 is a flowchart of another embodiment of a WLAN data transmission method according to this application. After step 401, the method further includes the following.

Step 402: If the first STA receives, within a preset time period, no acknowledgement frame sent by the second STA, the first STA decreases a value of an MCS used for sending each preamble and the data, and resends the preamble and the data based on the modified value of the MCS.

An MCS sub-field included in the preamble is used to indicate an adjustable MCS, and may be the MCS sub-field in the HE-SIG-A field shown in the figure. The first STA sends data based on a rate corresponding to the value of the MCS in the MCS field. It is assumed that when the first STA sends data and a preamble to the second STA for the first time, an MCS of quadrature phase shift keying (QPSK) is used, and a rate is 12 megabits per second (Mbit/s). After the first STA sends the data and the preamble, if no acknowledgement frame sent by the second STA is received within the preset time period, the first STA may decrease the rate of the MCS, for example, to an MCS of binary phase shift keying (BPSK) at a rate of 9 Mbit/s.

Figure 12:
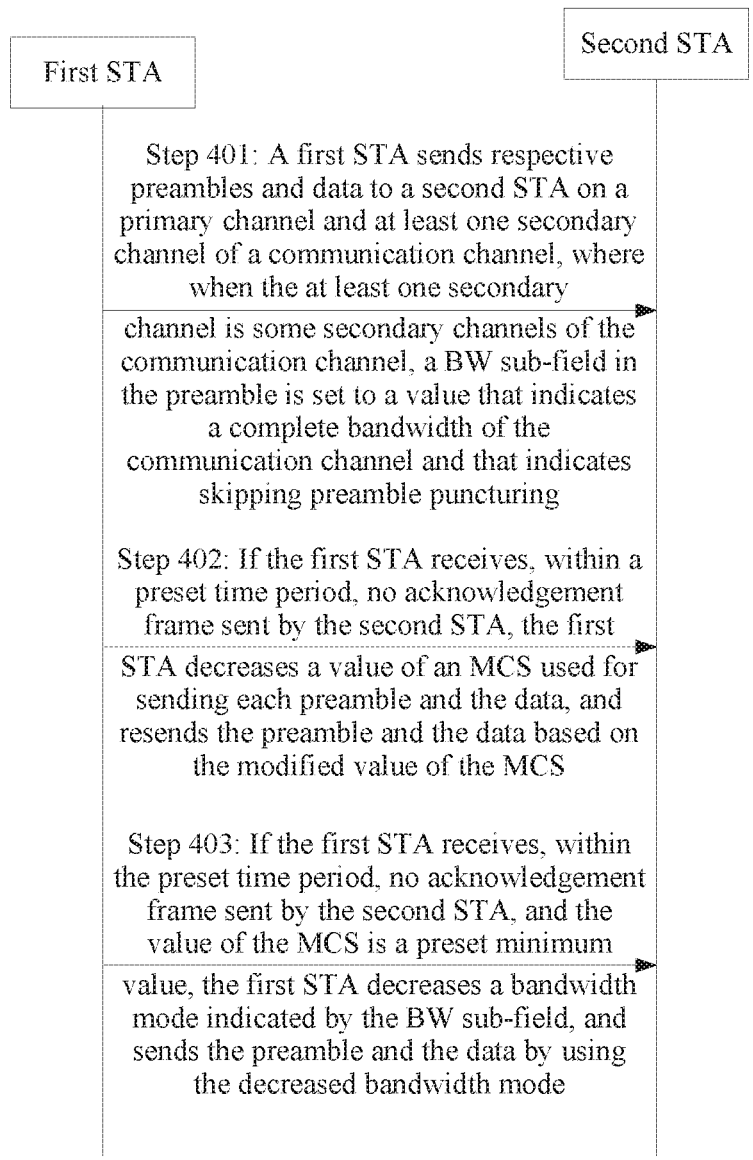
FIG. 12 is a flowchart of a WLAN data transmission method according to yet another embodiment of this application.

Optionally, based on FIG. 11, as shown in FIG. 12, after step 402, the method further includes the following.

Step 403: If the first STA receives, within the preset time period, no acknowledgement frame sent by the second STA, and the value of the MCS is a preset minimum value, the first STA decreases a bandwidth mode indicated by the BW sub-field, and sends the preamble and the data using the decreased bandwidth mode.

In this example, if the first STA receives no acknowledgement frame yet within the preset time period after the value of the MCS is decreased, the first STA may continue to decrease the value of the used MCS. If the first STA receives no acknowledgement frame yet within the preset time period when a quantity of times of allowing the first STA to repeatedly send data and a preamble is reached (for example, a quantity of repeat times is three) or a value of an allowed MCS has been decreased to a minimum value, the first STA decreases the bandwidth mode, that is, the value of the BW sub-field, and resends the data and the preamble based on a decreased bandwidth mode. For example, corresponding to a communication channel with a complete bandwidth of 80 MHz, if no acknowledgement frame is received when the value of the BW sub-field is 2, the BW sub-field may be set to 0 or 1, and data and a preamble are resent based on a bandwidth mode of the mode 0 or the mode 1.

The foregoing mainly describes the solutions provided in this application from the perspective of interaction between devices. To implement the foregoing functions, each device, such as the first STA, includes a corresponding hardware structure and/or software module for performing each of the functions. A person skilled in the art should be easily aware that, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application without departing beyond the scope of this application.

In this application, function modules of the first STA and the like may be divided based on the foregoing method example. For example, function modules may be divided based on functions, or two or more functions may be integrated into one processing module. The module division in this application is an example, and is merely logical function division. There may be another division manner during actual implementation.

Figure 13:
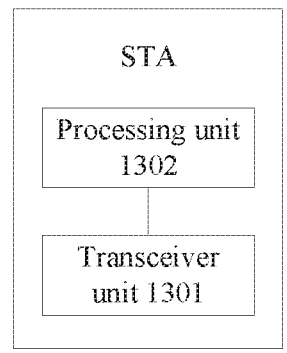
FIG. 13 is a schematic structural diagram of a STA according to an embodiment of this application.

FIG. 13 is a possible schematic structural diagram of a STA according to this application. The STA includes a transceiver unit and a processing unit, and can implement the steps performed by the first STA in the foregoing embodiments.

The transceiver unit 1301 is configured to send respective preambles and data on a primary channel and at least one secondary channel of a communication channel to a second STA.

When the at least one secondary channel includes some secondary channels of the communication channel, the processing unit 1302 sets a bandwidth sub-field in the preamble to a value that indicates a complete bandwidth of the communication channel and that indicates skipping preamble puncturing.

Optionally, a value of the bandwidth sub-field is 2 or 3.

Optionally, the transceiver unit 1301 is further configured such that if no acknowledgement frame sent by the second STA is received within a preset time period, the transceiver unit 1301 decreases a value of a modulation and coding scheme MCS used for sending each preamble and the data, and resends the preamble and the data based on the modified value of the MCS.

Optionally, the processing unit 1302 is further configured such that before the transceiver unit 1301 sends the respective preambles and the data on the primary channel and the at least one secondary channel of the communication channel to the second STA, the processing unit 1302 performs clear channel assessment CCA on the communication channel, where a result of the CCA is that the communication channel includes the idle primary channel, the at least one idle secondary channel, and at least one busy secondary channel.

FIG. 9 is a possible schematic structural diagram of a transmitter chip according to this application, including a control circuit 1001, a signal processing circuit 1002, and a transmitter circuit 1003. The transmitter chip is applied to a first STA, such that the first STA can implement the steps in the foregoing embodiments.

The control circuit 1001 is configured such that when a channel mode of a communication channel is a primary channel and at least one secondary channel, and the at least one secondary channel includes some channels of the communication channel, the control circuit 1001 sets a bandwidth BW sub-field in a to-be-sent preamble to a value that indicates a complete bandwidth of the communication channel and that indicates skipping preamble puncturing.

The signal processing circuit 1002 is configured to perform signal processing on the preamble in which the BW sub-field is set and to-be-sent data based on a bandwidth mode indicated by the BW sub-field.

The transmitter circuit 1003 is configured to send each processed preamble and processed data to a second STA on the primary channel and the at least one secondary channel.

Optionally, the transmitter circuit 1003 includes a transmitter sub-circuit corresponding to each channel of the communication channel.

That the transmitter circuit 1003 sends each processed preamble and processed data to a second STA on the primary channel and the at least one secondary channel is such that a transmitter sub-circuit corresponding to the primary channel sends, to the second STA on the primary channel, the processed preamble and the processed data that are corresponding to the primary channel; and each of at least one transmitter sub-circuit that is in a one-to-one correspondence with the at least one secondary channel sends, to the second STA on a corresponding secondary channel, the preamble and the data that are corresponding to the corresponding secondary channel.

Optionally, a value of the BW sub-field is 2 or 3.

Optionally, the signal processing circuit 1002 is further configured such that if the STA receives, within a preset time period, no acknowledgement frame sent by the second STA, the signal processing circuit 1002 decreases a value of an MCS used for sending each preamble and the data.

The transmitter circuit 1003 is further configured to resend, based on the value of the MCS modified by the signal processing circuit 1002, the preamble and the data that are processed by the signal processing circuit 1002.

Optionally, the control circuit 1001 is further configured such that if the STA receives, within the preset time period, no acknowledgement frame sent by the second STA, and the value of the MCS is a preset minimum value, the control circuit 1001 decreases a bandwidth mode indicated by the BW sub-field.

The signal processing circuit 1002 is further configured to perform, based on a modified and decreased bandwidth module, signal processing again on the preamble and the data that are modified by the control circuit 1001.

The transmitter circuit 1003 is further configured to send each re-processed preamble and re-processed data using the decreased bandwidth mode.

Optionally, the control circuit 1001 is further configured such that before the bandwidth BW sub-field in the to-be-sent preamble is set to the value that indicates the complete bandwidth of the communication channel and that indicates skipping preamble puncturing, the control circuit 1001 obtains a CCA result of clear channel assessment performed on the communication channel, where the CCA result is that the primary channel and the at least one secondary channel are idle.

Figure 14:
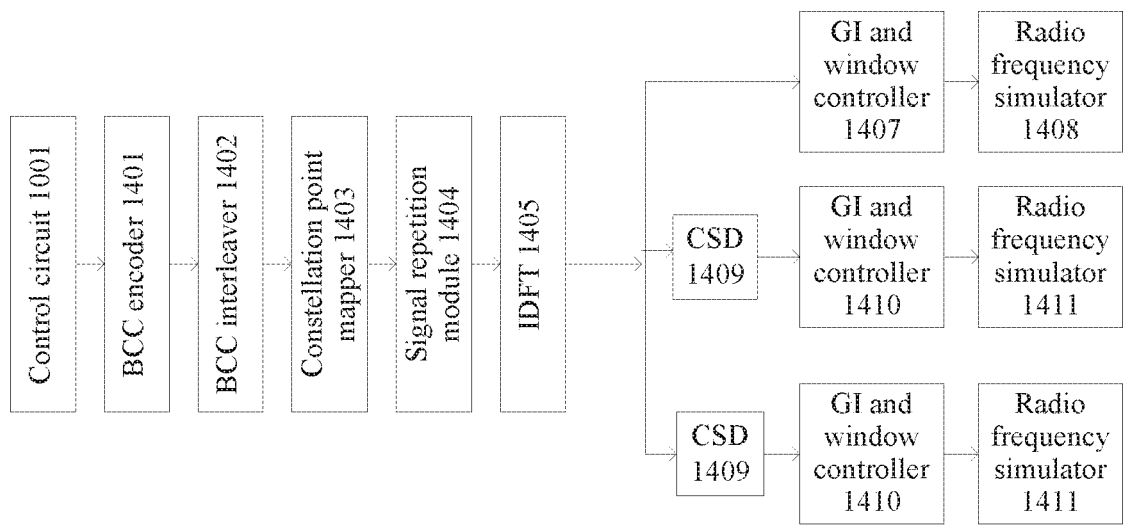
FIG. 14 is a second schematic structural diagram of a transmitter chip according to an embodiment of this application.

Based on FIG. 9, FIG. 14 is a possible implementation form of a transmitter chip according to this application. The signal processing circuit 1002 may include a BCC encoder 1401, a BCC interleaver 1402, a constellation point mapper 1403, a signal repetition module 1404, an IDFT 1405, and the like. The transmitter sub-circuit corresponding to the primary channel includes a GI and window controller 1407, a radio frequency simulator 1408, and the like that are corresponding to the primary channel. A transmitter sub-circuit corresponding to each secondary channel includes a CSD 1409, a GI and window controller 1410, a radio frequency simulator 1411, and the like that are corresponding to the secondary channel.

This application further provides a WLAN device, including the transmitter chip shown in FIG. 9. The WLAN device may be a wireless access point, a mobile phone, a tablet computer, a wearable device, or the like.

The foregoing descriptions are implementations of this application, but are not intended to limit the protection scope of this application.

What is claimed is:

1. A wireless local area network data transmission method, comprising:
   performing, by a first station (STA) a clear channel assessment (CCA) on a communication channel comprising a primary channel and a plurality of secondary channels;
   setting, by the first STA, a bandwidth (BW) sub-field in a preamble to a value after the first STA determines, based on the CCA, that the plurality of secondary channels include one or more busy channels that are unavailable for data transmission;
   sending, by the first STA, the preamble and data on the primary channel and an idle channel of the plurality of secondary channels to a second STA, wherein the value of the BW sub-field indicates to the second STA that the primary channel and each of the plurality of secondary channels are available for transmission even though the plurality of secondary channels include the one or more busy channels.

2. The method according to claim 1, wherein the value of the BW sub-field is set to indicate a bandwidth mode of the communication channel, and wherein the first STA sends the preamble and the data on the primary channel and the idle channel without decreasing the bandwidth mode.

3. The method according to claim 2, wherein a complete bandwidth of the communication channel is 80 megahertz (MHz), 160 MHz, or 80+80 MHz, and wherein the bandwidth mode comprises mode 2 or 3.

4. The method according to claim 1, further comprising:
decreasing, by the first STA when the first STA does not receive an acknowledgement frame from the second STA within a preset time period, a value of a modulation and coding scheme (MCS) used for sending the preamble and the data to a decreased value; and
resending, by the first STA, the preamble and the data based on the decreased value of the MCS.

5. The method according to claim 1, wherein a result of the CCA is that the primary channel and some channels of the plurality of secondary channels are idle, and wherein the first STA refrains from sending the preamble and the data on any of the one or more busy channels of the plurality of secondary channels.

6. The method according to claim 1, wherein the first STA sets the value of the BW sub-field to indicate to the second STA a non-preamble puncturing mode to demodulate the data.

7. A station (STA), comprising:
a transceiver unit configured to send, to a second STA, respective preambles and data on a primary channel of a communication channel and a plurality of secondary channels of the communication channel; and
a processing unit coupled to the transceiver unit, wherein the processing unit is configured to:
perform a clear channel assessment (CCA) on the communication channel; and
set a bandwidth sub-field in a preamble to a value after determining, based on the CCA, that the plurality of secondary channels include one or more busy channels that are unavailable for data transmission, wherein the value indicates to the second STA that the primary channel and each of the plurality of secondary channels are available for transmission even though the plurality of secondary channels include the one or more busy channels.

8. The STA according to claim 7, wherein the value of the bandwidth sub-field is set to indicate a bandwidth mode of the communication channel.

9. The STA according to claim 8, wherein the bandwidth mode comprises mode 2 or 3.

10. The STA according to claim 7, wherein the transceiver unit is further configured such that when an acknowledgement frame from the second STA is not received within a preset time period, the transceiver unit decreases a value of a modulation and coding scheme (MCS) used for sending each preamble and the data to a decreased value and resends the respective preambles and the data based on the decreased value of the MCS.

11. The STA according to claim 7, wherein a result of the CCA is that the communication channel comprises an idle primary channel, at least one idle secondary channel, and at least one busy secondary channel.

12. A transmitter chip, applied to a station (STA), comprising:
a control circuit configured such that when a channel mode of a communication channel includes a primary channel and a plurality of secondary channels having some channels of the communication channel, the control circuit sets a bandwidth (BW) sub-field in a to-be-sent preamble to a value that indicates a complete bandwidth of the communication channel and that indicates a non-preamble puncturing mode;
a signal processing circuit configured to perform signal processing on the to-be-sent preamble in which the BW sub-field is set and to-be-sent data based on a bandwidth mode indicated by the BW sub-field; and
a transmitter circuit coupled to the control circuit and configured to send each preamble and data to a second STA on the primary channel and an idle channel of the plurality of secondary channels, wherein the value of the BW sub-field indicates to the second STA that the primary channel and each of the plurality of secondary channels are available for transmission even though the plurality of secondary channels include one or more busy channels that are unavailable for transmission.

13. The transmitter chip according to claim 12, wherein the transmitter circuit comprises a transmitter sub-circuit corresponding to each channel of the communication channel, and wherein when the transmitter circuit sends each preamble and data to the second STA on the primary channel and the plurality of secondary channels, the transmitter sub-circuits corresponding to each channel of the communication channel are configured such that:
a transmitter sub-circuit corresponding to the primary channel sends, to the second STA on the primary channel, a preamble and data corresponding to the primary channel; and
each of at least one transmitter sub-circuit that is in a one-to-one correspondence with the plurality of secondary channels sends, to the second STA on a corresponding secondary channel, a preamble and data corresponding to the secondary channel.

14. The transmitter chip according to claim 12, wherein the value of the BW sub-field is set to indicate a bandwidth mode of the communication channel.

15. The transmitter chip according to claim 14, wherein the bandwidth mode comprises mode 2 or 3, wherein the complete bandwidth of the communication channel is 160 megahertz (MHz) or 80+80 MHz, and wherein a channel mode of the communication channel is as follows: a primary channel and at least one secondary channel of a primary 80 MHz channel are idle, and at least one secondary channel of a secondary 80 MHz channel is idle.

16. The transmitter chip according to claim 15, wherein mode 2 is an 80 megahertz (MHz) non-preamble puncturing mode.

17. The transmitter chip according to claim 15, wherein mode 3 is a 160 megahertz (MHz) and 80+80 MHz non-preamble puncturing mode.

18. The transmitter chip according to claim 12, wherein the signal processing circuit is further configured such that when the STA does not receive, within a preset time period, an acknowledgement frame from the second STA, the signal processing circuit decreases a value of a modulation and coding scheme (MCS) used for sending each preamble and the data to create a decreased value, and wherein the transmitter circuit is further configured to resend, based on the decreased value of the MCS, each preamble and the data that are processed by the signal processing circuit.

19. The transmitter chip according to claim 12, wherein the control circuit is further configured such that before the bandwidth BW sub-field in the to-be-sent preamble is set to the value that indicates the complete bandwidth of the communication channel and that indicates the non-preamble puncturing mode, the control circuit obtains a clear channel assessment (CCA) result of a CCA performed on the communication channel.

20. The transmitter chip according to claim 19, wherein the CCA result is that the primary channel and some channels of the plurality of secondary channels are idle.

\* \* \* \* \*